United States Patent [19]

Matthews

[11] Patent Number: 4,485,647
[45] Date of Patent: Dec. 4, 1984

[54] LOCKING FUEL CAP

[75] Inventor: William S. Matthews, Huron, Ohio

[73] Assignee: General Motors Corporation, Detroit, Mich.

[21] Appl. No.: 394,544

[22] Filed: Jul. 2, 1982

[51] Int. Cl.³ .............................................. B65D 55/14
[52] U.S. Cl. ...................................... 70/165; 220/210
[58] Field of Search ................................. 70/165–173, 70/218, 221; 220/210, 202, 303

[56] References Cited

U.S. PATENT DOCUMENTS

| | | | |
|---|---|---|---|
| 4,083,209 | 4/1978 | Sloan, Jr. | 220/210 X |
| 4,107,960 | 8/1978 | Neiman | 220/210 X |
| 4,132,091 | 1/1979 | Aro et al. | 220/210 X |
| 4,280,346 | 7/1981 | Evans | 220/210 X |
| 4,280,347 | 7/1981 | Evans | 220/210 X |
| 4,299,102 | 11/1981 | Aro | 220/210 X |
| 4,342,208 | 8/1982 | Evans | 220/210 X |

Primary Examiner—Gary L. Smith
Assistant Examiner—Lloyd A. Gall
Attorney, Agent, or Firm—Donald F. Scherer

[57] ABSTRACT

A locking fuel cap has a handgripping shell that is selectively connected to a threaded closure through a lock mechanism and a torque limiting mechanism. The torque limiting mechanism is operable to limit torque in the closing direction. The lock mechanism has a key actuated latch member which is engageable with a drive finger to align the drive finger with cooperating drive surfaces on the torque limiting mechanism when the fuel cap is unlocked. The latch mechanism maintains the drive finger aligned when the key is operated to the lock position until the fuel cap is installed. The latch mechanism is released by the drive finger engaging the drive surface during such installation so that the drive finger can return to the unaligned position if removal of the fuel cap is attempted while the lock mechanism is in the locked position.

3 Claims, 5 Drawing Figures

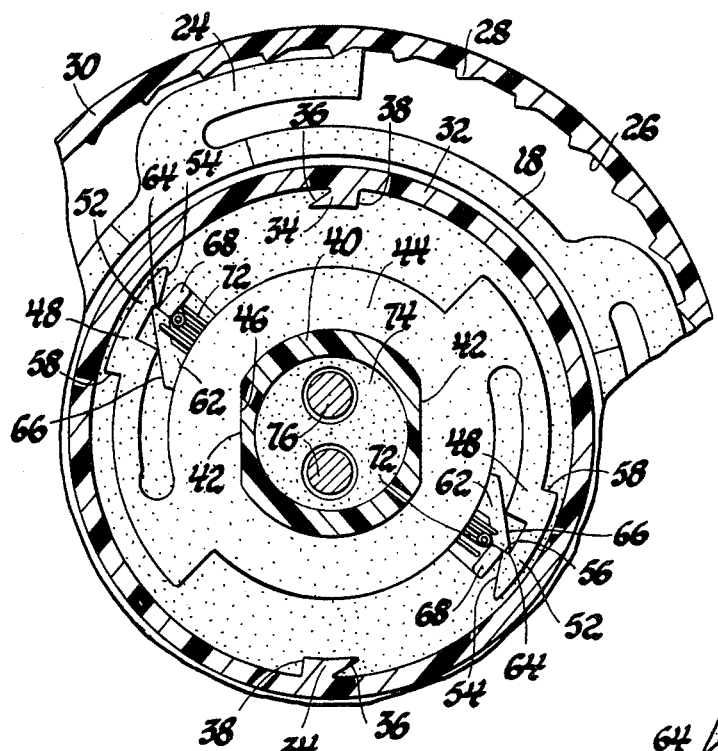

LOCKING FUEL CAP

This invention relates to fuel caps and more particularly to fuel caps having lock mechanisms incorporated therein.

It is an object of this invention to provide an improved fuel cap lock mechanism having a drive connection which is automatically conditioned for disengagement when the fuel cap is installed and the lock mechanism has been conditioned to the locked position.

It is another object of this invention to provide an improved fuel cap and lock mechanism wherein a drive mechanism is conditioned through a latch mechanism for drive relationship with a limited torque cap closing mechanism when the cap is unlocked and wherein the drive mechanism is unlatched when the cap is locked so that the drive connection will disengage when the fuel cap is installed.

It is a further object of this invention to provide an improved fuel cap and locking mechanism wherein the locking mechanism has at least one drive finger which is engageable with a torque limiting mechanism to connect the fuel cap handgrip with a threaded closure portion by actuation of a latch mechanism when the key lock is in the unlocked position and wherein installation of the fuel cap will enforce unlatching of the mechanism when the key lock is conditioned to lock the fuel cap.

These and other objects and advantages of the present invention will be more apparent from the following description and drawings in which:

FIGS. 3, 4 and 5 are similar to FIG. 2 showing the fuel cap in various operating conditions.

Figure 1:
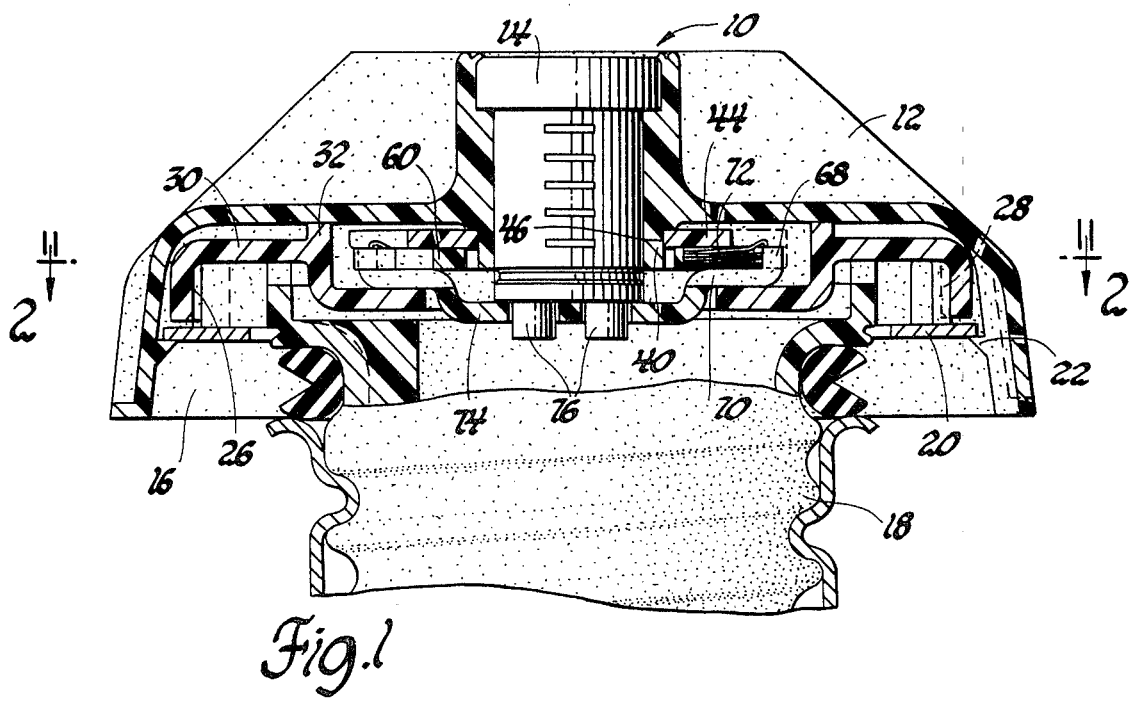
FIG. 1 is a cross-sectional elevational view of a fuel cap.
Figure 2:
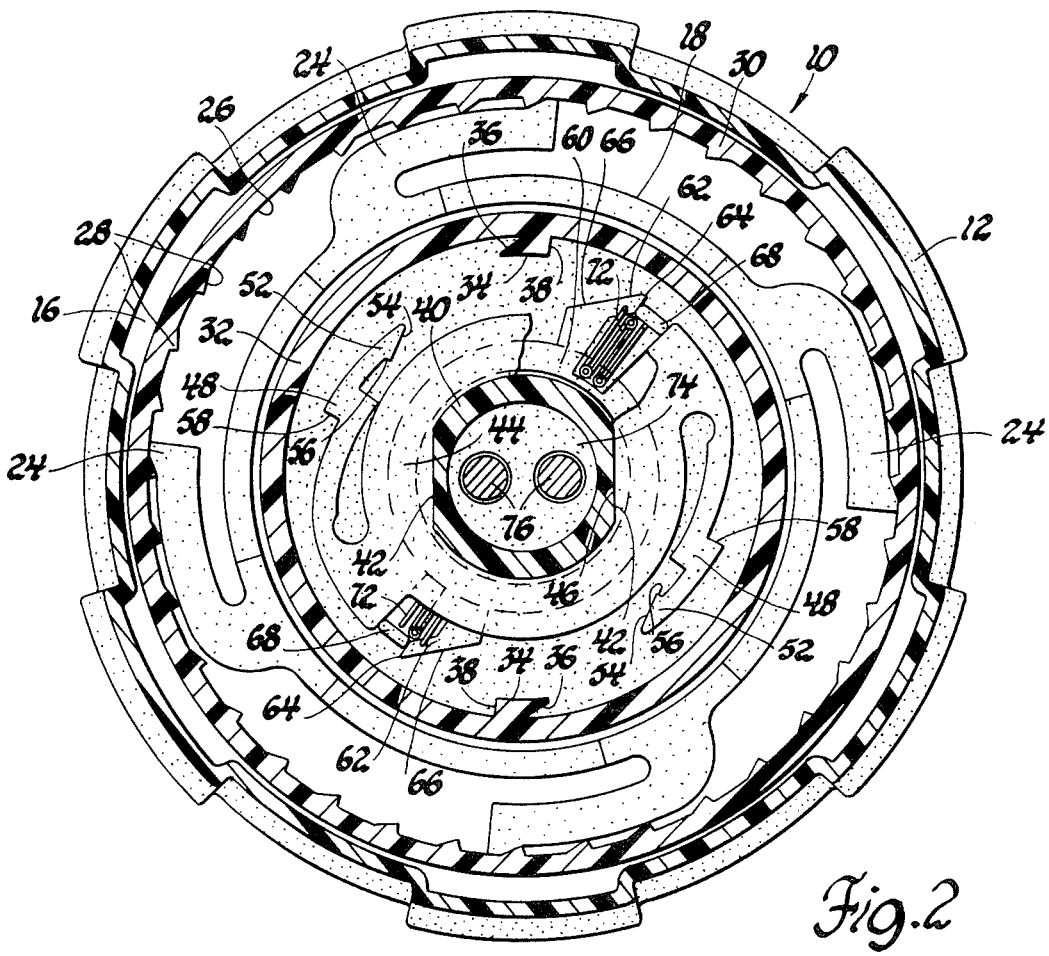
FIG. 2 is a view taken along line 2—2 of FIG. 1.

Referring to the drawings, wherein like characters represent the same or corresponding parts throughout the several views, there is seen, particularly in FIGS. 1 and 2, a fuel cap generally designated 10, having a handgripping shell portion 12 in which is secured a conventional key-operated lock cylinder 14. The shell 12 is preferably a molded structure and has an internally formed cavity 16 in which is secured a threaded closure member 18. The closure member 18 is secured in position by an annular plate 20 which is positioned in cavity 16 by an inwardly protruding annular rib 22.

The closure 18 has a plurality of torque or drive arms 24 which extend radially outwardly for engagement with a cam surface 26. The cam surface 26 has a plurality of cams or ramp members 28 formed thereon which cooperate with the drive arms 24 to form a drive connection. The drive connection is such that a limited torque can be transmitted when the cam surface 26 is rotated clockwise, as viewed in FIG. 2, while a positive drive connection is established if the cam surface 26 is rotated in the counterclockwise direction.

The cam surface 26 is formed on a ring member 30 which also includes an annular drive hub 32. The drive hub 32 has formed thereon a pair of drive lugs 34, each of which has an oblique drive surface 36 and a radially extending drive surface 38.

The shell 12 has a central post portion 40 which extends axially into the cavity 16. The post 40 is generally circular in cross section and has formed thereon a pair of flat surfaces 42.

A drive ring 44 is positioned on the post 40 and has a central opening 46 shaped to cooperate with the shape of post 40 such that the drive ring 44 will rotate with the shell 12. The drive ring 44 has a pair of integrally formed drive fingers 48 which are cantilevered from the main body of the drive ring 44. Preferably, the drive ring 44 is a molded member and the drive fingers 48 are molded such that their normal position is as shown in FIG. 2. That is, the fingers 48 are maintained normally radially inward toward the main body of drive ring 44. The drive fingers 48 have a thickness greater than the thickness of the main body of drive ring 44 as seen in phantom line in FIG. 1. These thicker portions of the drive fingers 48 extend axially downward as viewed in FIG. 1 from the plane of the main body of drive ring 44.

Each drive finger 48 has a drive end 52 having an angled surface 54 formed thereon. The angled surface 54 terminates in a notched surface 56. Each drive finger 48 also has a substantially radially extending drive surface 58 which is spaced from end 52. These surfaces 54, 56 and 58 are formed in the axially thicker portion of drive fingers 48.

Rotatably disposed on the post 40 is a latch plate 60. The latch plate 60 has a central cylindrical opening which is sized to be slidably supported on the outer cylindrical surface of post 40. Thus, the latch plate 60 is rotatable relative to the shell 12 and the drive ring 44. The latch plate 60 has a pair of radially extending latch members 62 having a substantially pointed end 64 and a ramp surface 66 which are, at least partially, coplanar with the axially extended thickness of drive fingers 48. The latch members 62 are spring-loaded, as seen in FIG. 2, into abutment with actuator arms 68 which are formed on an actuator plate 70 by spring members 72.

The actuator plate 70 has a dish portion 74, as seen in FIG. 1, which is connected to a pair of posts 76 which are a portion of the lock cylinder 14. The lock cylinder 14 is preferably key-operated such that operation of the lock cylinder will result in rotation of each post 76 about the central axis of the lock cylinder 14. Rotation of the post 576 will result in rotation of the actuator plate 70. Since the latch plate 60 is in abutment with the actuator plate 70, the latch plate 60 is also rotated by the lock 14.

The lock mechanism and the drive ring 44 with its integral drive fingers 48 are shown in the locked position in FIG. 2. It can be seen that the drive ends 52 and 58 will not align with respective drive surfaces 36 and 38. Therefore, the handgrip can rotate freely relative to ring member 30 such that there is no drive connection between the handgrip shell 12 and the ring member 30.

When the lock mechanism 14 is moved to the unlocked position, the actuator arm 68 and latch member 62 will be rotated therewith. Upon sufficient rotation thereof, the surface 66 of latch members 62 will engage the angled surface 54 of drive end 52. This engagement will result in radial outward movement of the drive finger 48 until the pointed end 64 of latch member 62 is in engagement with the notch 56 on drive finger 48. This is the position shown in FIG. 3. In this position, the radial drive surfaces 58 are aligned to engage surface 38 of drive lug 34. If the handgripping shell is rotated to remove the fuel cap, the drive surfaces 38 and 58 will be in engagement such that counterclockwise rotation of cam surface 26 will occur. As previously mentioned, this will permit positive drive between the cam surface 26 and the closure 18 such that the fuel cap can be removed.

If the lock cylinder 14 is rotated to the locked position, the actuator arm 68 will be rotated to the position shown in FIG. 4, while the latch member 62 will remain latched to the drive finger 48. The spring 72 will elongate and urge the latch member 62 back into abutment with the actuator arm 68. This movement is prevented by the latching arrangement.

With the lock mechanism 14 in the locked position, the operator may install the cap on the fuel fill tube. During installation, the handgrip shell 12 is rotated clockwise as viewed in FIGS. 3, 4 and 5. With this rotation, the drive end 52 of drive finger 48 will be forced into abutment with the oblique surface 36 of drive lug 34. The abutment of surfaces 54 and 36 will result in a slight radial outward movement of the end 52 of drive arm 48 such that the point 64 of latch member 62 will be allowed to escape engagement from the notch 56. The spring 72 will then cause the latch plate 60 to rotate so that the latch member 62 will return to abutment with actuator arm 68.

The drive end 52 will remain in engagement with the drive lug 34, however, continued rotation of the handgrip shell in the installation direction, will cause the threaded closure 18 to be installed on the threaded fill tube until sufficient tightness occurs at which time the arms 24 will ratchet over the cam ramps 28 such that further tightening of the fuel cap cannot occur.

If the handgripping shell 12 is rotated in the counterclockwise direction or the cap removal direction, the drive ends 52 will disengage from drive lugs 34 and, the resiliency in drive fingers 48 will cause the drive fingers 48 to move radially inward such that abutment between surfaces 58 and 38 cannot occur. This will place the cap in the condition shown in FIG. 2 so that cap removal is not possible.

In operating the locking fuel cap, when the cap is installed, the operator will insert the key, unlock the mechanism 14, thus conditioning the lock mechanism to the position shown in FIG. 3; after which, the lock mechanism 14 is returned to the locked position and the key removed thus leaving the lock mechanism conditioned as shown in FIG. 4. From FIG. 4, the fuel cap can be either installed or removed. If the fuel cap is removed, the locking mechanism will remain in the condition shown in FIG. 4, that is, the latch member 62 will remain engaged with the drive fingers 48 to maintain the drive fingers 48 in the radially outward position.

If the fuel cap is operated in the installing direction, the lock mechanism will move to the position shown in FIG. 5 so that only installation of the fuel cap is permitted. When the lock mechanism is in the condition shown in FIG. 5, attempted removal of the fuel cap will result in the drive fingers 48 assuming the position shown in FIG. 2 such that neither cap removal or installation will be possible until the lock mechanism 14 is again key-operated.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property of privilege is claimed are defined as follows:

1. A fuel cap for closing a fuel fill tube comprising; a handgripping portion; a threaded closure portion rotatably supported in said handgripping portion and adapted to threadably engage the fill tube and being rotatable therein to move in an opening direction and a closing direction; coupling means rotatably disposed in said handgripping portion for providing a positive couple with said threaded closure portion in the opening direction and for providing a torque limited couple with said threaded closure portion in the closing direction and including drive lug means; lock means disposed in said handgripping portion and being movable to lock and unlock positions; and lock controlled means having actuator means including a latch plate rotatably supported on said handgripping portion and an actuator arm operatively connected with said lock means, drive means including integral drive finger means engageable by and responsive to said latch plate of said actuator means for selectively drivingly engaging said drive lug means to selectively connect said coupling means to said handgripping portion when said lock means is moved to the unlock position for permitting selective removal of said fuel cap, and latch means formed on said latch plate and said drive finger means for maintaining said drive finger means aligned for engagement with said drive lug means when said lock means is moved to the lock position until said coupling means undergoes the torque limiting operation during rotation of said fuel cap in the closing direction and engagement of said drive finger means with said drive lug means permits release of said latch means.

2. A fuel cap for closing a fuel fill tube comprising; a handgripping portion; a threaded closure portion rotatably supported in said handgripping portion and adapted to threadably engage the fill tube and being rotatable therein to move in an opening direction and a closing direction; coupling means rotatably disposed in said handgripping portion for providing a positive couple with said threaded closure portion in the opening direction and for providing a torque limited couple with said threaded closure portion in the closing direction and including drive lug means having a radially extending drive surface and an oblique drive surface; lock means disposed in said handgripping portion and being movable to lock and unlock positions; lock controlled means having actuator means including an actuator arm operatively connected with said lock means, a latch plate rotatably supported on said handgripping portion for movement relative to said actuator arm and including a latch member extending radially from the latch plate and resilient means for interconnecting said latch plate and said actuator arm; and drive means including integral drive finger means engageable by and responsive to said latch member of said actuator means for selectively drivingly engaging said drive lug means through said radially extending drive surface during opening rotation to selectively connect said coupling means to said handgripping portion when said lock means is moved to the unlock position for permitting selective removal of said fuel cap, and said latch member being operative to engage said drive finger means for maintaining said drive finger means aligned for engagement with said drive lug means through said oblique drive surface after said lock means is moved to the lock position until said coupling means undergoes the torque limiting operation during rotation of said fuel cap in the closing direction, said engagement of said drive finger means with said oblique drive surface of said drive lug means permitting release of said latch member.

3. A fuel cap for closing a fuel fill tube comprising; a handgripping portion; a threaded closure portion rotatably supported in said handgripping portion and adapted to threadably engage the fill tube and being rotatable therein to move in an opening direction and a closing direction; coupling means rotatably disposed in said handgripping portion for providing a positive couple with said threaded closure portion in the opening direction and for providing a torque limited couple with said threaded closure portion in the closing direction and including drive lug means; lock means disposed in said handgripping portion and being movable to lock and unlock positions; and lock controlled means having actuator means including a latch plate rotatably supported on said handgripping portion and an actuator arm operatively connected with said lock means, drive means including integral drive finger means having a notched surface, latch means formed on said latch plate including a ramp surface for engaging and moving said drive finger means radially outward for circumferential alignment with said drive lug means and an end surface engaging said notched surface on said drive finger means for maintaining said drive finger means aligned for engagement with said drive lug means when said lock means is moved to the lock position until said coupling means undergoes the torque limiting operation during rotation of said fuel cap in the closing direction and engagement of said drive finger means with said drive lug means permits release of said latch means, and resilient means for disengaging said latch plate from said drive finger and for enforcing relative movement therebetween so that relatching will not occur until said lock means is moved to the unlock position.

* * * * *